US009976112B2

(12) United States Patent
Thomas

(10) Patent No.: US 9,976,112 B2
(45) Date of Patent: May 22, 2018

(54) ABSORBENT PADS AND METHODS OF MANUFACTURING

(71) Applicant: Merit Medical Systems, Inc., South Jordan, UT (US)

(72) Inventor: Meriadeg Thomas, Saint Denis (FR)

(73) Assignee: Merit Medical Systems, Inc., South Jordan, UT (US)

(*) Notice: Subject to any disclaimer, the term of this patent is extended or adjusted under 35 U.S.C. 154(b) by 113 days.

(21) Appl. No.: 15/060,194

(22) Filed: Mar. 3, 2016

(65) Prior Publication Data

US 2016/0257915 A1    Sep. 8, 2016

Related U.S. Application Data

(60) Provisional application No. 62/128,357, filed on Mar. 4, 2015.

(51) Int. Cl.
| | | |
|---|---|---|
| *B29C 35/18* | (2006.01) | |
| *C11D 17/04* | (2006.01) | |
| *B29C 44/12* | (2006.01) | |
| *B29C 44/34* | (2006.01) | |
| B29K 29/00 | (2006.01) | |
| B29K 105/08 | (2006.01) | |
| B29L 31/00 | (2006.01) | |
| B29K 105/04 | (2006.01) | |

(52) U.S. Cl.
CPC ............ *C11D 17/049* (2013.01); *B29C 35/18* (2013.01); *B29C 44/1266* (2013.01); *B29C 44/3415* (2013.01); B29K 2029/04 (2013.01); B29K 2105/046 (2013.01); B29K 2105/0809 (2013.01); B29L 2031/753 (2013.01)

(58) Field of Classification Search
CPC .. B29C 35/18; B29C 44/3403; B29C 44/3415
USPC ...................................... 521/65, 66, 68, 141
See application file for complete search history.

(56) References Cited

U.S. PATENT DOCUMENTS

| | | | |
|---|---|---|---|
| 4,098,728 A | 7/1978 | Rosenblatt | |
| 4,506,404 A | 3/1985 | Clay | |
| 4,517,702 A | 5/1985 | Jackson | |
| 4,663,358 A | 5/1987 | Hyon et al. | |
| 4,866,806 A | 9/1989 | Bedford | |
| 5,789,464 A | 8/1998 | Muller | |
| 6,268,405 B1 * | 7/2001 | Yao | A61L 27/16 264/28 |
| 7,763,006 B2 | 7/2010 | Tennican | |
| 2008/0010766 A1 | 1/2008 | Kaufman et al. | |
| 2013/0065765 A1 * | 3/2013 | Selifonov | C08F 8/14 504/361 |
| 2015/0034122 A1 | 2/2015 | Mottola et al. | |

FOREIGN PATENT DOCUMENTS

| | | |
|---|---|---|
| EP | 0189375 | 7/1986 |
| EP | 0745104 | 3/1998 |
| JP | 200060877 | 2/2000 |
| WO | 2004017495 | 8/2004 |

OTHER PUBLICATIONS

Office Action dated Dec. 20, 2016 for U.S. Appl. No. 14/450,788.
Abdeen, et al., "Enhancement of Crude Oil Biodegradation by Immobilizing of Different Bactreial Strains on Porous PVA Hydrogels or Combining of them with their Produced Biosurfactants", Petroleum & Environmental Biotechnology, vol. 5, Issue 5, 2014, 1-10.
Bansal, "Water-Based Polymeric Nanostructures for Agricultural Applications", Dissertation, 2010, 182 pgs.
Bodugoz, et al., "Preparation of Poly (Vinyl Alcohol) Hydrogels with Radiation Grafted Citric and Succinic Acid Groups", Radiation Physics and Chemistry, 55, 1999, 667-671.
Buist, et al., "The Mechanism of Oxidation of a-Glycols by Periodic Acid. Part X. The Oxidation of Pinacol, and a General Discussion of the Stability of Periodate Esters and their Role in the Mechanism of Oxidation", J. Chem. Soc. (B), 1971, 2128-2142.
Cavalieri, et al., "Study of Gelling Behavior of Poly(Vinyl Alcohol)-Methacrylate for Potential Utilizations in Tissue Replacement and Drug Delivery", Biomacromolecules, 5, 2004, 2439-2446.
Chaouat, et al., "A Novel Cross-Linked Poly (Vinyl Alcohol) (PVA) for Vascular Grafts", Advanced Functional Materials, 18, 2008, 2855-2861.
Chung, et al., "Surface Engineered and Drug Releasing Pre-Fabricated Scaffolds for Tissue Engineering", Advanced Drug Delivery Reviews, 59, 2007, 249-262.
Crispim, et al., "Addition of Methacryloil Groups to Poly (Vinyl Alcohol) in DMSO Catalyzed by TEMED: OptimizationThrough Response Surface Methodology", Elsevier, Polymer Testing, 25, 2006, 377-383.
Crispim, et al., "Hydrogels Based on Chemically Modified Poly (Vinyl Alcohol) (PVA-GMA) and PVA-GMA/Chondroitin Sulfate: Preparation and Characterization", eXPRESS Polymer Letters, vol. 6, No. 5, 2012, 383-395.
Dutta, "Synthesis and Characterization of y-Irradiated PVA/PEG/CaC12 Hydrogel for Wound Dressing", American Journal of Chemistry, 2(2), 2012, 6-11.
El-Mohdy, et al., "Biodegradability, Antimicrobial Activity and Properties of PVA/PVP Hydrogels Prepared by y-Irradiation", J. Polym Res, 16, 2009, 1-10.
Gohil, et al., "Studies on the Cross-Linking of Poly (Vinyl Alcohol)", Journal of Polymer Research, 13, 2006, 161-169.
Gupta, et al., "Interpenetrating Network Superporous Hydrogels for Gastroretentive Application-Preparation, Swelling and Mechanical Properties", Turk J Pharm Sci, 9(2), 2012, 127-138.

(Continued)

*Primary Examiner* — Edward J Cain
(74) *Attorney, Agent, or Firm* — Stoel Rives LLP

(57) ABSTRACT

The embodiments disclosed herein relate to absorbent pads. The absorbent pads can be used as cleansing wipes, and can be used to clean various objects, including gloves, medical appliances, and elongate medical devices. The absorbent pads can include a polymer matrix and a reinforcement member. Methods of manufacturing the absorbent pads can include physically cross-linking a polymer solution or foam to form a cross-linked polymer matrix. One or more freeze-thaw cycles can be used to cross-link the polymer solution or foam.

17 Claims, 5 Drawing Sheets

(56) References Cited

OTHER PUBLICATIONS

Hassan, et al., "Structure and Applications of Poly (Vinly Alcohol) Hydrogels Produced by Conventional Crosslinking or by Freezing/Thawing Methods", Advances in Polymer Science, vol. 153, 2000, 38-65.

Laurent, "D'un Materiau Innovant vers un Pansement Actif et un Substitut Cutane", HAL Archives-Ouvertes, Universite de Cergy Pontoise, 2012.

Lewis, et al., "Polymeric and Self Assembled Hydrogels: Biomedica Applications of Hydrogels: Poly(Vinyl Alcohol)-Based Hydrogels for Embolotherapy and Drug Delivery", Monographs in Supramolecular Chemistry, Edited by Xian Jun Loh and Oren A. Scherman, Chapter 10, 2013, 232-252.

Lima, et al., "Thermal Crosslilnking in Membranes of Polyvinyl Alcohol for use as Cartilage", 21st Brazilian Congress of Mechanical Engineering, Oct. 2011.

Martens, et al., "Characterization of Hydrogels Formed From Acrylate Modified Poly(Vinyl Alcohol) Macromers", Elsevier, Polymer, 41, 2000, 7715-7722.

Martens, et al., "Synthesis and Characterization of Degradable Hydrogels Formed From Acrylate Modified Poly (Vinyl Alcohol) Macromers", Elsevier, Polymer, 43, 2002, 6093-6100.

Mishra, et al., "Radiation Induces crosslilnking Effect on Semi-Interpenetrating Polymer Networks fo Poly(Vinyl Alcohol)", eXPRESS Polymer Letters, vol. 1, No. 7, 2007, 407-415.

Muscatello, et al., "Poly (Vinyl Alcohol) Rehydratable Photonic Crystal Sensor Materials", Advanced Functional Materials, 18, 2008, 1186-1193.

Nuttleman, et al., "Synthesis and Characterization of Photocrosslinkable, Degradable Poly (Vinyl Alcohol)-Based Tissue Engineering Scaffolds", Biomaterials, 23, 2002, 3617-3626.

Parvin, et al., "Preparation and Characterization of Gamma Irradiated Sugar Containing Starch/Poly (Vinly Alcohol)-Based Blend Films", J Polym Environ, 19:, 2011, 1013-1022.

Parvin, et al., "Preparation and Characterization of Starch/PVA Blend for Biodegradable Packaging Material", Advanced Material Research, vols. 123-125, 2010, 351-354.

Patachia, et al., "Tailoring of Poly(Vinyl Alcohol) Cryogels Properties by Salts Addition", eXPRESS Polymer Letters, vol. 3, No. 5, 2009, 320-331.

Peppas, et al., "Ultrapure Poly(Vinyl Alcohol) Hydrogels with Mucoadhesive Drug Delivery Characteristics", European Journal of Pharmaceutics and Biopharmaceutics, 43, 1997, 51-58.

Philipp, et al., "Three Methods for In Situ Cross-Linking of Polyvinyl alcohol Films for Application as Ion-conducting Membranes in Potassium Hydroxide Electrolyte", NASA Technical Paper 1407, Apr. 1979.

Rafat, et al., "Dual Functionalized PVA Hydrogels that Adhere Endothelial Cells Syngeristically", Biomaterials, 33, 2012, 3880-3886.

Razzak, et al., "Irradiation of Polyvinyl Alcohol for Polyvinyl Pyrrolidone Blended Hydrogel for Wound Dressing", Radiation Physics and Chemistry, 62, 2001, 107-113.

Razzak, et al., "The Characterization of Dressing Component Materials and Radiation Formation of PVA-PVP Hydrogel", Radiation Physics and Chemistry, 55, 1999, 153-165.

Riyajan, et al., "Effect of Potassium on the Physical Property of PVA", Proceedings of the 7th IMT-GT UNINET and The 3rd International PSU-UNS Conferences on Bioscience, 2010, 220-223.

Rojas, et al., "Functionalization and Crosslinking of Microcrystalline Cellulose in Aqueous Media: A Safe and Ecomonic Approach", International Journal of Pharmaceutical Sciences Review and Research, vol. 8, Issue 1, 2011, 28-36.

Schmedlen, et al., "Photocrosslinkable Polyvinyl Alcohol Hodrogels that can be Modified with Cell Adhesion Peptides for use in Tissue Engineering", Biomaterials, 23, 2002, 4325-4332.

Sharaf, et al., "Mechanical and Relaxation Properties of y-Irradiated PVA doped with Ferrous Sulphate", Polymer Degradation and Stability, 66, 1999, 173-177.

Sirousazar, et al., "Dehydration Kinetics of Polyvinly Alcohol Hydrogel Wound Dressing During Wound Healing Process", Chinese Journal of Polymer Science, vol. 28, No. 4, 2010, 573-580.

Stauffer, et al., "Poly(Vinyl Alcohol) Hydrogels Prepared by Freezing-Thawing Cyclic", Polymer, vol. 33, No. 18, 1992, 3932-3936.

Xiao, et al., "Synthesis and Properties of Starch-G-Poly (Maleic Anhydride-Co-Vinly Acetate)", eXPRESS Polymer Letters, vol. 4, No. 1, 2010, 9-16.

Zhai, et al., "Syntheses of PVA/Starch Grafted Hydrogels by Irradiation", Carbohydrate Polymers, 50, 2002, 295-303.

Notice of Allowance dated Mar. 31, 2017 for U.S. Appl. No. 14/450,788.

\* cited by examiner

ABSORBENT PADS AND METHODS OF MANUFACTURING

RELATED APPLICATIONS

This application claims priority to U.S. Provisional Application No. 62/128,357, filed on Mar. 4, 2015 and titled "Absorbent Pads and Methods of Manufacturing," which is hereby incorporated by reference in its entirety.

TECHNICAL FIELD

The present disclosure relates generally to absorbent pads and methods of manufacturing the same. The absorbent pads can be used as cleansing wipes, and can be used to clean various objects, including gloves, medical appliances, and elongate medical devices.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

It will be readily understood by one of skill in the art having the benefit of this disclosure that the components of the embodiments, as generally described and illustrated in the figures herein, could be arranged and designed in a variety of configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

Figure 1A:
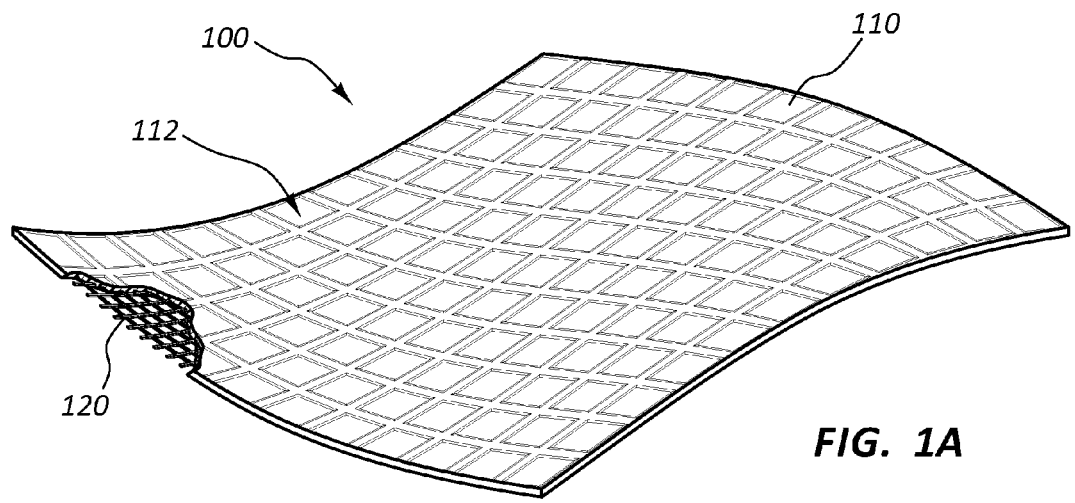
FIG. 1A is a perspective view of an absorbent pad, according to an embodiment of the present disclosure.
Figure 1B:
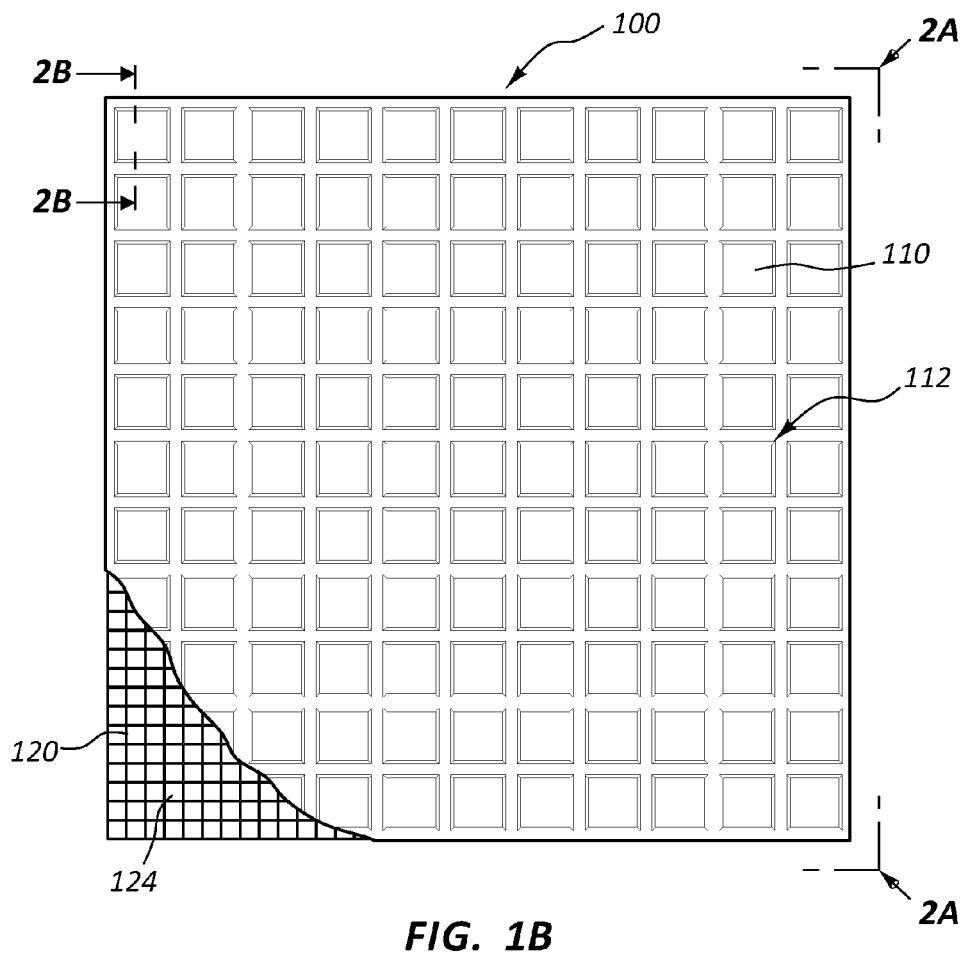
FIG. 1B is a plan view of the absorbent pad of FIG. 1A.

Shown in FIGS. 1A and 1B is an absorbent pad 100, according to an embodiment of the present disclosure. More specifically, FIG. 1A is a perspective view of the absorbent pad 100 and FIG. 1B is a plan view of the absorbent pad 100. The absorbent pad 100 can also be described as an absorbent wipe, an absorbent sheet, a cleansing wipe, or a cleansing sheet. The absorbent pad 100 can be used to clean a variety of objects. For example, in some embodiments, the absorbent pad 100 may be used during a medical procedure to clean gloves (e.g., surgical gloves), medical appliances, and elongate medical devices. Some such medical procedures may include, but are not limited to, vascular procedures and wire-based interventions. Such medical procedures may be conducted in ambulatory care centers, catheterization laboratories, electrophysiology departments, hospitals, interventional suites, operating rooms, surgical centers, or other locations.

During a medical procedure, gloves, medical appliances, and elongate medical devices may become soiled by contact with bodily fluids (e.g., blood), tissue fragments, medical contrast media, and/or other matter. The absorbent pad 100 may be configured to at least partially (or completely) clean or remove such matter from gloves, medical appliances, and elongate medical devices. For example, during a catheterization a guide wire or catheter may become at least partially coated with blood and/or other matter. The absorbent pad 100, which may be substantially flexible and non-rigid, may be wrapped around a portion of the guide wire or catheter such that upon agitation or movement of the guide wire or catheter against the absorbent pad 100 the blood and/or other matter may be at least partially (or completely) cleaned or removed from the guide wire or catheter.

The absorbent pad 100 includes a polymer matrix 110. The polymer matrix 110 can comprise various polymeric materials, including, but not limited to, polymers and/or copolymers of polyvinyl alcohol, polyhydroxyethylmethacrylate (pHEMA), polyacrylate, polyacrylic acid, polyamine, polyamide, and derivatives and/or mixtures thereof. In some embodiments, the polymer matrix 110 is cross-linked. For example, as detailed below, the polymer matrix 110 can be cross-linked by subjecting the polymer matrix 110 to one or more freeze-thaw cycles. The polymer matrix 110 can be hydrophilic. The polymer matrix 110 can also be absorbent and/or swellable (e.g., water swellable, liquid swellable, etc.). The polymer matrix 110 can also be biocompatible, non-toxic, and/or hypoallergenic.

The absorbent pad 100 can be hydrated and/or dehydrated. For example, in some embodiments, the absorbent pad 100 is dried, packaged, and stored in a dehydrated state. Prior to use, the absorbent pad 100 can be hydrated (or rehydrated) with a hydration solution (e.g., saline). In other embodiments, the absorbent pad 100 is packaged and stored in a hydrated or saturated state (e.g., packaged in a saline solution). Further, when the absorbent pad 100 is in a hydrated or saturated state, the polymer matrix 110 can be described as being in gel form, or hydrogel form.

The absorbent pad 100 is also absorbent and/or swellable (e.g., water-swellable, liquid-swellable). For example, the absorbent pad 100 is configured such that liquid can be absorbed into the polymer matrix 110. In a particular embodiment, the absorbent pad 100 can be configured to absorb two or more times its dry weight in liquid. In other embodiments, the absorbent pad 100 can be configured to absorb ten or more times its dry weight in liquid, including four times or more, six times or more, and eight times or more its dry weight in liquid.

Further, in certain embodiments, the absorbent pad 100 can be described as being sponge-like. For example, the absorbent pad 100 (or the polymer matrix 110 of the absorbent pad 100) can include a porous structure. The porous structure can allow for dehydration/rehydration of the absorbent pad 100. The porous structure can also provide absorbent properties to the absorbent pad 100.

The absorbent pad 100 is also lint free such that the absorbent pad 100 does not shed or otherwise leave behind lint after being used to clean or wipe an object. The polymer matrix 110 of the absorbent pad 100 can also be non-fibrous and non-particulate such that the absorbent pad 100 does not shed or otherwise leave behind fibers and/or other particulates after being used to clean or wipe an object. Lint free, non-fibrous, and/or non-particulate materials can reduce the chance of infection and/or other complication that can occur during a medical procedure, which can be caused by lint, fibers, and/or other particulates inadvertently entering a patient's body or vasculature.

As shown in FIG. 1A, the absorbent pad 100 is substantially flexible and non-rigid. The absorbent pad 100 is also elastic. The flexibility and/or elasticity of the absorbent pad 100 can allow the absorbent pad 100 to be folded, bent, and/or wrapped around the surface of an object to be cleaned. In some embodiments, the degree of flexibility and/or elasticity of the absorbent pad 100 can be controlled or limited by the amount of cross-linking within the polymer matrix 110, which can be affected by the number of freeze-thaw cycles applied during manufacturing of the absorbent pad 100. In further embodiments, the degree of flexibility and/or elasticity of the absorbent pad 100 can be controlled or limited by the use of a reinforcement member 120, as further detailed below.

The absorbent pad 100 can also be at least partially impregnated with an anticoagulant, an antimicrobial, a cleansing solution, a saline solution, or combinations thereof. For example, in some embodiments, the absorbent pad 100 is at least partially impregnated with an anticoagulant such as heparin. The anticoagulant can be used to control, limit, and/or prevent coagulation of bodily fluids on the surface of the absorbent pad 100 as coagulated blood on the surface of the absorbent pad 100 may inhibit and/or interfere with the cleaning capabilities or properties of the absorbent pad 100. The anticoagulant may also control, limit, and/or reduce thrombogenesis on the surface of the absorbent pad 100.

In certain embodiments, the absorbent pad 100 is at least partially impregnated with an antimicrobial, such as an antibacterial agent and/or an antifungal agent. The antimicrobial agent can be used to control, limit, and/or prevent the growth of microorganisms on the absorbent pad 100. The antimicrobial agent can also be used to control, limit, and/or prevent the growth of microorganisms on the surface of the object that is cleaned by the absorbent pad 100.

In further embodiments, the absorbent pad 100 is at least partially impregnated with a cleansing solution and/or a saline solution. For example, the absorbent pad 100 can be packaged in a saturated state with a saline solution. The saline solution can be configured to keep the absorbent pad 100 hydrated or moist. In some embodiments, the absorbent pad 100 may be configured to hydrate or moisten a portion of medical appliance or elongate medical device that is cleaned by absorbent pad 100, or the absorbent pad 100 may be configured to maintain a medical appliance or elongate medical device in a hydrated or moistened state. For example, a guide wire or other device may be configured with a hydrophilic coating. Maintenance of the hydration of such a coating may increase the lubricity, cleanliness, and/or handling of the guide wire during surgery or therapy.

In some embodiments, the absorbent pad 100 is textured. For example, an outer surface 112 of the absorbent pad 100 can be textured. In some embodiments, the surface 112 of the absorbent pad 100 can be textured with a waffle-like pattern, such as shown in FIGS. 1A and 1B. Other texture patterns can also be used, including but not limited to, rectangular or square grid-like patterns, triangular patterns, diamond patterns, circular patterns, wave patterns, etc. The texture pattern can also comprise a plurality of indentations or protrusions (e.g., semi-circular or semi-spherical protrusions). The textured surface 112 may act to enhance friction upon contact and/or agitation between gloves, medical appliances, or elongate medical devices and the textured surface 112 of the absorbent pad 100. Such friction may enhance the ability of the absorbent pad 100 to remove bodily fluids, tissue fragments, medical contrast media, and/or other matter from the surface of gloves, medical appliances, or elongate medical devices. The textured surface 112 can also aid in handling of the absorbent pad 100. In other embodiments, if desired, the surface 112 of the absorbent pad 100 may be substantially smooth.

It will be appreciated that the absorbent pad 100 can be formed into any desired shape and/or size. For example, the absorbent pad 100 of FIGS. 1A and 1B is substantially rectangular. In other embodiments, the absorbent pad 100 can be substantially circular, substantially oval, or substantially triangular in shape. Other shapes can also be used as desired. For example, the absorbent pad 100 can be molded and/or formed into any desired shape, or cut to any desired shape after manufacturing.

The thickness of the absorbent pad 100 can also vary as desired. For example, in some embodiments the thickness of the absorbent pad 100 is between about 1.0 mm and about 3.5 mm, between about 1.0 mm and about 3 mm, or between about 1.0 mm and about 2.5 mm. In other embodiments, the thickness of the absorbent pad 100 is between about 1.25 mm and about 2.25 mm. In yet other embodiments, the thickness of the absorbent pad 100 is between about 1.5 mm and about 2.0 mm. Greater or lesser thicknesses can also be used as desired.

As shown in the cut-away portions of FIG. 1A and 1B, in some embodiments the absorbent pad 100 can comprise a reinforcement member 120. The reinforcement member 120 can be at least partially (or completely) disposed within the polymer matrix 110 of the absorbent pad 100. The reinforcement member 120 can provide strength and/or structural conformation to the absorbent pad 100. In some embodiments, the reinforcement member 120 is used to control and/or limit the flexibility and/or elasticity of the absorbent pad 100.

Figure 2A:
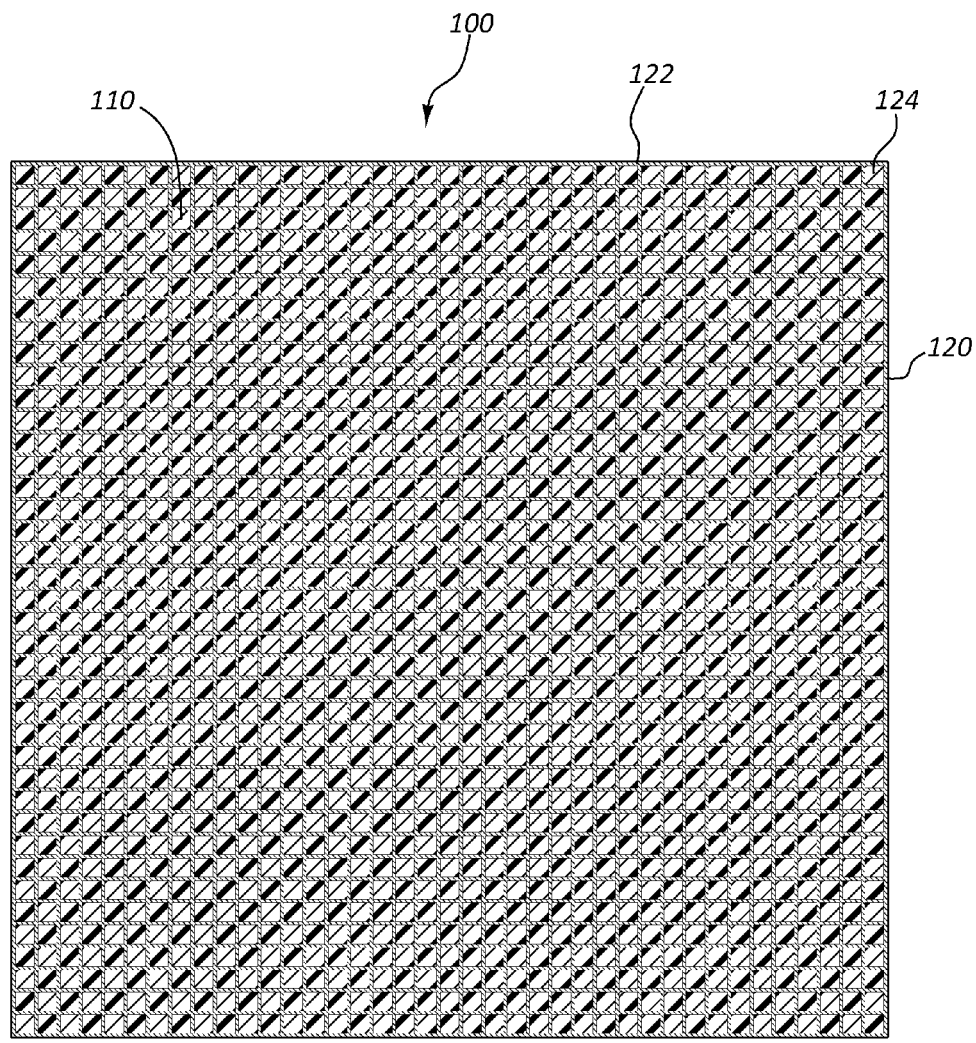
FIG. 2A is a cross-sectional view of the absorbent pad of FIG. 1B.
Figure 2B:
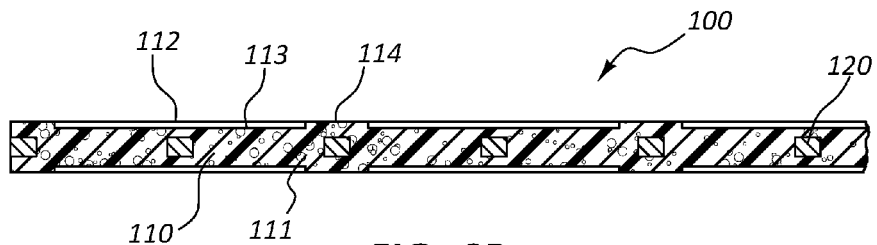
FIG. 2B is an enlarged cross-sectional view of a portion of the absorbent pad of FIG. 1B.

The reinforcement member 120 is further depicted in FIGS. 2A and 2B. FIG. 2A depicts a cross-sectional view of the absorbent pad 100 of FIG. 1B taken along the viewing plane 2A-2A, and FIG. 2B depicts an enlarged cross-sectional view of a portion of the absorbent pad 100 of FIG. 1B taken along the view line 2B-2B. As shown in FIGS. 2A and 2B, in some embodiments, the reinforcement member 120 comprises a mesh or scrim structure 122 having one or more holes 124 (or apertures or openings) extending therethrough. For example, the reinforcement member 120 can comprise a fabric mesh or scrim 122, such as a polyester mesh or scrim 122. Other materials can also be used. In certain embodiments, the reinforcement member 120 comprises a single-fiber fabric mesh or scrim 122. In other embodiments, a multi-fiber fabric mesh or scrim 122 can be used.

The density of the mesh or scrim 122 can also vary as desired. For example, in some embodiments the reinforcement member 120 comprises a fabric mesh or scrim 122 having less than about 20 yarns (or threads) per centimeter, less than about 15 yarns (or threads) per centimeter, or less than about 10 yarns (or threads) per centimeter. Other densities of mesh or scrim 122 can also be used.

It will further be appreciated that properties of the mesh or scrim 122 can be modified depending on the desired strength of the absorbent pad 100. For example, a higher density mesh or scrim 122 can be used to obtain a stronger and/or more rigid absorbent pad 100. A multi-fiber mesh or scrim 122 can also be used to obtain a stronger and/or more rigid absorbent pad 100. Analogously, the density and/or fiber count of the mesh or scrim 122 can be decreased if a more flexible and elastic absorbent pad 100 is desired.

As further shown in FIGS. 2A and 2B, the reinforcement member 120 is disposed at least partially within the polymer matrix 110 of the absorbent pad 100. The polymer matrix 110 can also include a porous structure 111, as shown in FIG. 2B. As previously discussed, the porous structure 111 can provide absorbent properties to the absorbent pad 100. For example, in some embodiments, increasing the number of pores in the porous structure 111 can allow for better absorption or hydration within the polymer matrix 110. Further, in some embodiments a relatively higher number of smaller interconnected pores can allow for faster and more complete hydration as compared to a relatively lower amount of larger pores.

FIG. 2B further shows the textured surface 112 of the absorbent pad 100. For example, as shown in FIG. 2B, the textured surface 112 can be molded to include one or more indentations, depressions, or recesses 113. The combination of one or more indentations, depressions, or recesses 113 adjacent to one or more non-recessed portions 114 can provide the textured surface 112 to the absorbent pad 100.

Figure 3:
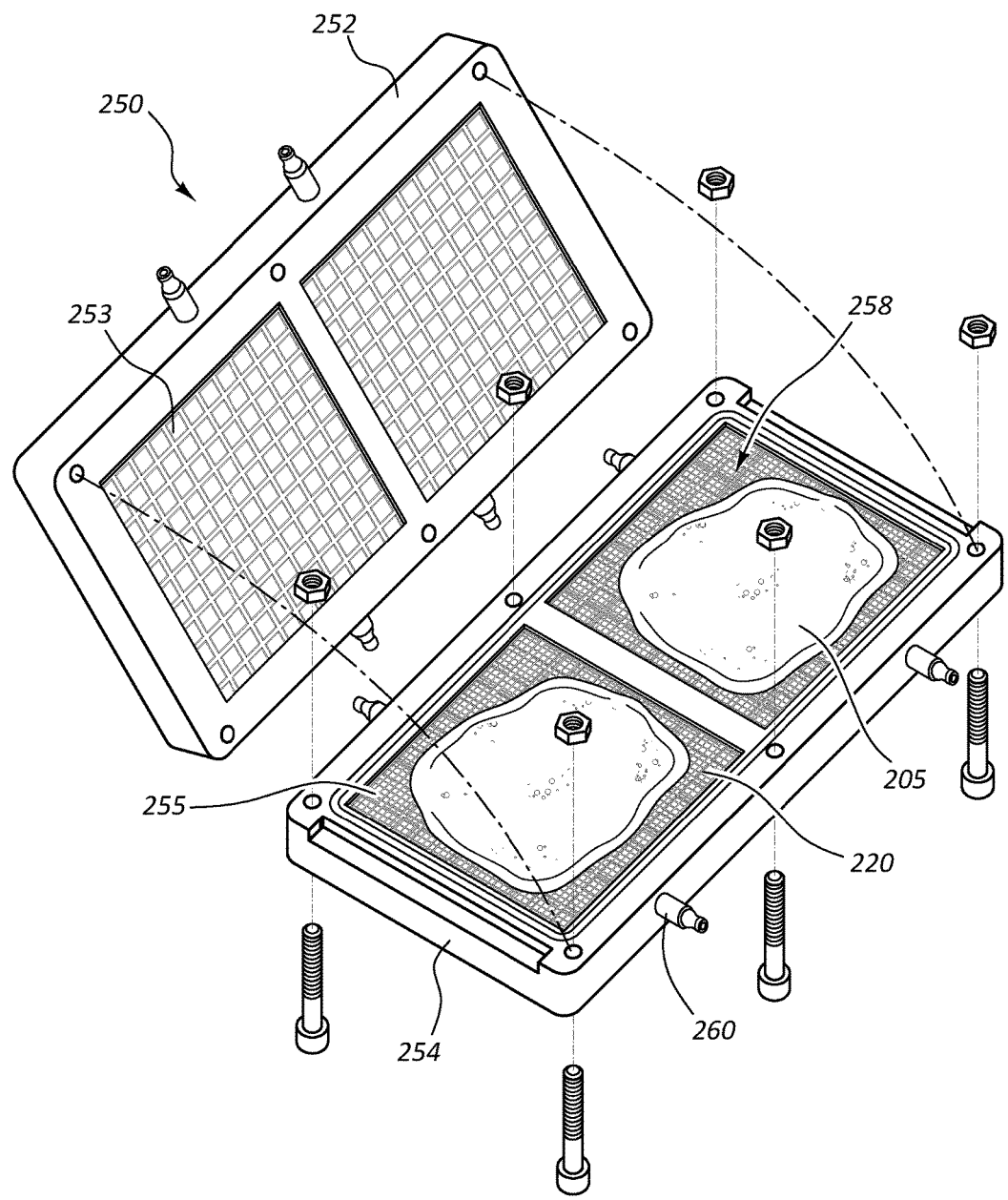
FIG. 3 is a perspective view of a mold apparatus for use in manufacturing an absorbent pad, according to an embodiment of the present disclosure.
Figure 4:
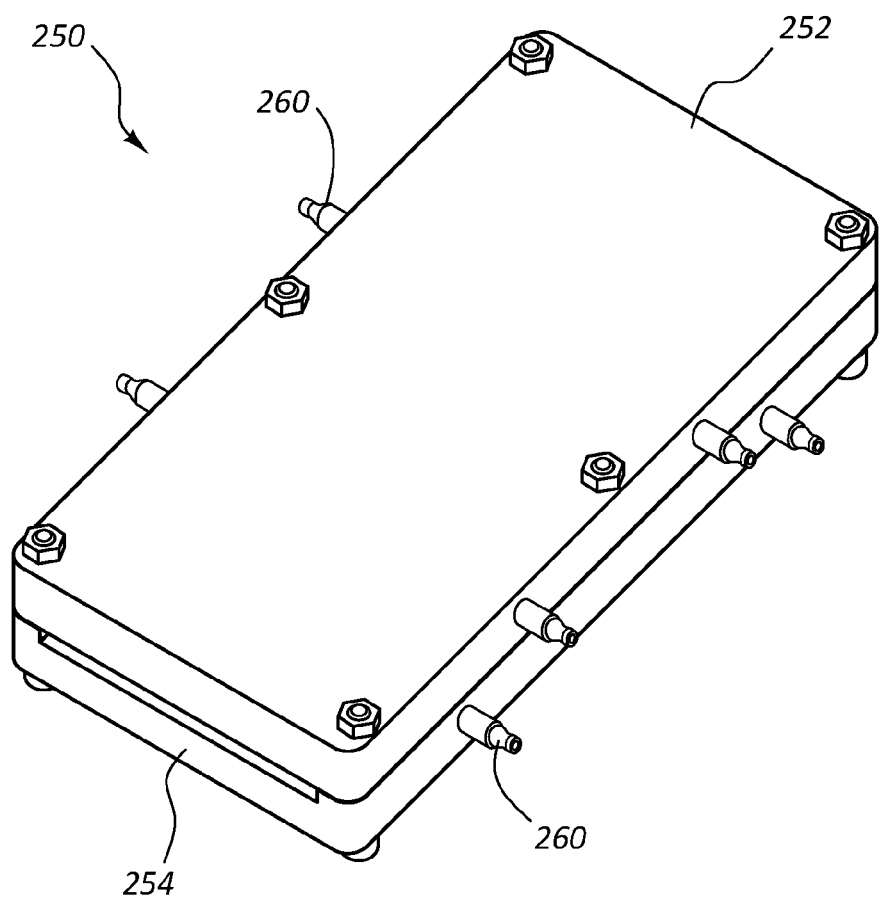
FIG. 4 is another perspective view of the mold apparatus of FIG. 3, shown in a closed configuration.

FIGS. 3 and 4 depict a mold apparatus 250 that can be used in manufacturing an absorbent pad, according to an embodiment of the present disclosure. More specifically, FIG. 3 depicts a mold apparatus 250 in an open configuration, and FIG. 4 depicts the mold apparatus 250 in a closed configuration. As shown in FIGS. 3 and 4, the mold apparatus 250 can include a first plate 252 and second plate 254.

In some embodiments, a surface 253, 255 of one or more of the first and second plates 252, 254 can be configured to impart a texture onto the absorbent pad molded therewith. For example, in the illustrated embodiment, an inner surface 253 of the first plate 252 and an inner surface 255 of the second plate 254 are each configured with a waffle-like pattern to impart a texture on the absorbent pad.

FIGS. 3 and 4 further depict a method of using the mold apparatus 250 in a manufacturing process. For example, in some embodiments, a reinforcement member 220 can be cut, sized, and/or shaped to fit within a mold apparatus 250. The reinforcement member 220 may then be disposed within the mold apparatus 250 (or within a cavity 258 of the mold apparatus 250 ). A polymer solution 205, which includes polymer matrix material, can also dispensed into the mold apparatus 250. For example, the polymer solution 205 can be poured into the mold apparatus 250, or injected into the mold apparatus 250. The mold apparatus 250 can then be closed, as shown in FIG. 4, and subjected to a curing process (e.g., a freeze-thaw process) as detailed below.

In some embodiments, the mold apparatus 250 further comprises one or more ports 260. The ports 260 can be used to inject the polymer solution 205 into the mold apparatus 250. The ports 260 can also be used as overflow ports. For example, excess polymer solution 205 can be forced out of the ports 260 as the plates 252, 254 are transitioned to the closed configuration.

As can be appreciated, the shape and/or size of the mold apparatus 250 can be changed as desired. For example, a larger mold apparatus 250 can be used to form a larger absorbent pad, and a smaller mold apparatus 250 can be used to form a smaller absorbent pad. A larger absorbent pad can also be cut to form a plurality of smaller absorbent pads. It will thus be appreciated that the mold apparatus need not be limited to the size and/or shape depicted in FIGS. 3 and 4.

Figure 5:
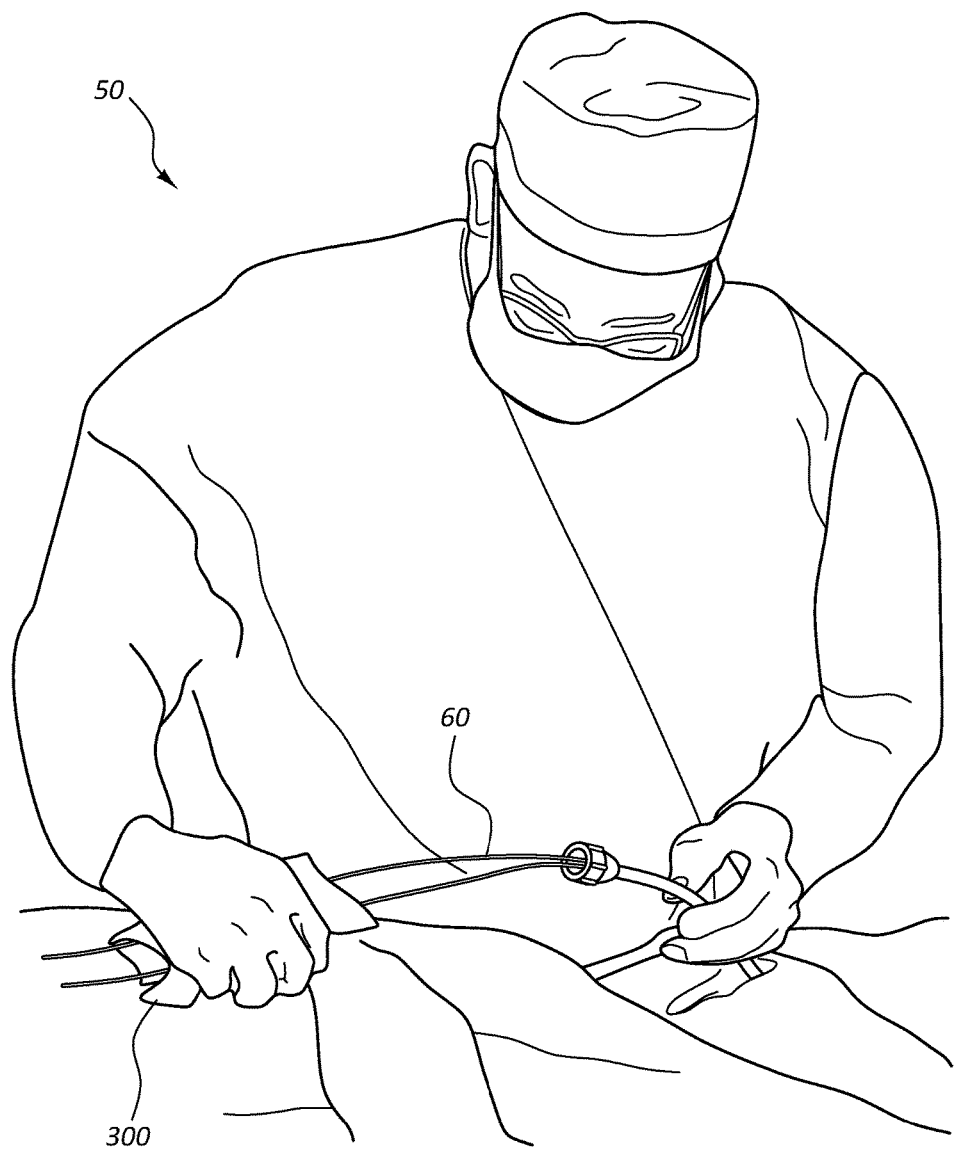
FIG. 5 is a perspective view of a method of using an absorbent pad, according to another embodiment of the present disclosure.

FIG. 5 depicts a method of using an absorbent pad 300, according to another embodiment of the present disclosure. As shown in FIG. 5, a user 50 can contact a portion of a soiled glove, medical appliance, or elongate medical device 60 with the absorbent pad 300. The user 50, such as a doctor or other medical practitioner, may then move or rub the absorbent pad 300 over the portion of the glove, medical appliance, or elongate medical device 60 such that at least a portion of the bodily fluids, tissue fragments, medical contrast media, and/or other matter disposed on the glove, medical appliance, or elongate medical device 60 are removed and remain on the absorbent pad 300. In some embodiments, the matter may be absorbed or wicked into the absorbent pad 300. In another embodiment of the method of FIG. 5, the method may comprise the step of at least partially impregnating or re-impregnating the absorbent pad 300 with an anticoagulant, antimicrobial, cleaning solution and/or a saline solution.

Methods of manufacturing absorbent pads are also disclosed herein. For example, in some embodiments, a method of manufacturing an absorbent pad can include a step of obtaining a polymer solution, which can include any of the above-identified polymeric materials included in the polymer matrix. For example, the polymer solution can include polymers and/or copolymers of polyvinyl alcohol, polyhydroxyethylmethacrylate (pHEMA), polyacrylate, polyacrylic acid, polyamine, polyamide, and derivatives and/or mixtures thereof. In some embodiments, the step of obtaining the polymer solution can include dissolving one or more polymer materials in a liquid solvent (e.g., water).

The concentration or the amount of polymeric material in the polymer solution can vary. For example, in some embodiments, the polymer solution includes between about 5% and about 25% by weight of polymer material, between about 10% and about 25% by weight of polymer material, between about 10% and about 20% by weight of polymer material, between about 12% and about 18% by weight of polymer material, or between about 12% and about 15% by weight of polymer material.

In certain embodiments, the polymer solution further comprises a surfactant, an emulsifier, a wetting agent, a foaming agent, or a combination thereof. Exemplary surfactants, emulsifiers, wetting agents, and foaming agents include, but are not limited to, sodium dodecyl sulfate (SDS), Triton (e.g., Triton X-100 , Triton X-200), polysorbates (e.g., polysorbate 20), siloxanes (e.g., poly[dimethylsiloxane-co-[3-(2-(2-hydroxyethoxy)ethoxy)propyl]methylsiloxane]), sulfonates (e.g., linear alkylbenzene sulfonates), etc. Other surfactants, emulsifiers, wetting agents, and/or foaming agents can also be used. In certain embodiments, a surfactant, emulsifier, wetting agent, and/or foaming agent having a hydrophilic-lipophilic balance (HLB) value of greater than about 10, or greater than about 12 is used.

The concentration or amount of the surfactant, emulsifier, wetting agent, or foaming agent can vary. For example, in some embodiments, the concentration or amount of surfactant, emulsifier, wetting agent, or foaming agent is dependent upon the concentration of polymer material in the polymer solution. For example, in some embodiments, the amount of the surfactant, emulsifier, wetting agent, or foaming agent used is between about 0.1% and about 10%, between about 0.1% and about 8%, or between about 0.1% and about 5%, by weight of the amount of polymer material used (based on the dry weight of the polymer material).

Optionally, one or more additives can also be included in the polymer solution. For example, additives can be used to modify or alter the properties of the polymer solution, or to modify or alter the properties of the resulting polymer matrix of the absorbent pad. Exemplary additives include, but are not limited to, thickeners, stabilizing agents, crystallization promoters or retardants, colorants (e.g., pigments), opacifiers, or combinations thereof.

Various types of thickeners and/or stabilizing agents can be used. Exemplary thickeners and/or stabilizing agents include, but are not limited to, polysaccharides such as starch (e.g., potato starch, rice starch, corn starch, maize starch, etc.), polyvinylpyrrolidone (PVP), celluloses (e.g., cellulose ethers such as 2-hydroxyethyl cellulose, carboxymethyl cellulose, hydropropyl cellulose, cellulose acetate butyrate, etc.), or derivatives and/or combinations thereof. The concentration or amount of the thickening agents and/or stabilizers can also vary. For example, in some embodiments, the concentration or amount of thickening agent and/or stabilizer is dependent upon the concentration of polymer material in the polymer solution. The concentration or amount of thickening agent and/or stabilizer can also be dependent upon the type of thickening agent and/or stabilizer that is used. For example, in some embodiments, the amount of thickeners or stabilizer (e.g., starch) used is between about 5% and about 50%, between about 10% and about 40%, or between about 10% and about 30%, by weight of the amount of polymer material used (based on the dry weight of the polymer material). In other embodiments, the amount of thickeners or stabilizer (e.g., PVP, celluloses, etc.) used is between about between about 0.1% and about 10%, between about 0.1% and about 8%, or between about 0.1% and about 5%, by weight of the amount of polymer material used (based on the dry weight of the polymer material).

Crystallization promoters and retardants can be used to modify or alter the curing properties of the polymer solution. For example, crystallization promoters can be used to increase the curing rate of the polymer solution, and crystallization retardants can be used to decrease the curing rate of the polymer solution. Crystallization promoters and retardants can also be used to modify or alter the degree of cross-linking that occurs during the curing process. Exemplary crystallization promoters or retardants include salts (e.g., salts such as NaCl, $NaNO_3$, $(NH_4)_2SO_4$, etc.), solvents (e.g., water miscible solvents such as alcohols (e.g., ethanol), dimethyl sulfoxide (DMSO), acetone, etc.) Other crystallization promoters and retardants can also be used. In some embodiments, the amount of crystallization promoters used is between about 1% to about 50%, between about 5% and about 40%, or between about 10% and about 30%, by weight of the amount of polymer material used (based on the dry weight of the polymer material).

Colorants (e.g., pigments) and opacifiers can be used to make the polymer solution (and resulting absorbent pad) a particular color or provide a desired opacity. For example, in some embodiments, a colorant or opacifier is used to make the polymer solution (and resulting absorbent pad) opaque. For example, titanium dioxide ($TiO_2$) can be used to impart a white color or provide opaque properties.

In certain embodiments, radio-opacifiers can be used to provide radiopaque properties to the absorbent pad. Radiopaque properties can be used to make the absorbent pad visible under X-ray or when viewed with a fluoroscope. Radiopaque properties can also reduce the likelihood of an absorbent pad being left inside a patient's body following a surgical procedure. Exemplary radio-opacifiers include, but are not limited to, barium sulfate ($BaSO_4$).

In some embodiments, the method of manufacturing the absorbent pad includes a step of mixing the polymer solution to form a foam. For example, a foam can be formed that includes gaseous bubbles or pockets dispersed within the polymer solution. The foam may also be described as a foamed mixture, or a foamed polymer mixture. In certain embodiments, the polymer solution is mixed until a substantially homogenous foam is achieved. In further embodiments, the foam is mixed until a creamy or pasty consistency is achieved. The foam can also be flowable such that it can be dispensed into a mold apparatus and formed or shaped into an absorbent pad, as detailed below.

The method of manufacturing the absorbent pad can also include a step of dispensing the polymer solution into a mold apparatus, or dispensing the foam into a mold apparatus. In some embodiments, the polymer solution or foam can be poured into a mold apparatus. In other embodiments, the polymer solution or foam can be injected into a mold apparatus.

Optionally, a reinforcement member can be disposed into the mold apparatus. For example, a reinforcement member can be cut or formed into a desired shape and/or size (e.g., a size that corresponds to the size of the mold apparatus). The reinforcement member can then be disposed into a cavity of the mold apparatus. In certain embodiments, the reinforcement member is disposed into the mold apparatus prior to dispensing the polymer solution or foam into the mold apparatus. In other embodiments, the reinforcement member is disposed into the mold apparatus after dispensing the polymer solution or foam into the mold apparatus. In yet other embodiments, a first portion of the polymer solution or foam is dispensed into the mold apparatus, after which the reinforcement member is disposed into the mold apparatus, after which a second portion of the polymer solution or foam can be dispensed into the mold apparatus (e.g., above or on top of the reinforcement member).

The method of manufacturing the absorbent pad can also include a curing step. During the curing step, the polymer solution or foam can be cured to form the polymer matrix of the absorbent pad. In some embodiments, curing the polymer solution or foam comprises cross-linking the polymer material to form a cross-linked polymer matrix. For example, in certain embodiments, a physical cross-linking process can be used, such as the freeze-thaw process described below.

In some embodiments, curing the polymer solution or foam comprises subjecting the polymer solution or foam (which can be contained within a mold apparatus) to at least one freeze-thaw cycle, which comprises a step of freezing the polymer solution or foam and a step of thawing the polymer solution or foam. In further embodiments, the polymer solution or foam is subjected to a plurality of freeze-thaw cycles during which the polymer solution or foam is subjected to a number of alternating freezing steps and thawing steps. For example, the curing step can comprise a first freezing step, a first thawing step, a second freezing step, and a second thawing step, etc. In some embodiments, two, or at least two, freeze-thaw cycles are used. Additional freeze-thaw cycles (e.g., three, four, or more) can also be used. In further embodiments, no more than four freeze-thaw cycles are used.

In some embodiments, increasing the number of freeze-thaw cycles can increase the mechanical properties of the resulting absorbent pad. For example, increasing the number of freeze-thaw cycles can increase the strength (e.g., tensile strength and Young's Modulus) and decrease the elasticity (e.g., percent elongation) of the absorbent pads. Increasing the number of freeze-thaw cycles can also decrease the hydrophilic properties of the absorbent pad. For example, in some embodiments, the absorption capacity of the resulting pad decreases by increasing the number of freeze-thaw cycles (e.g., from two freeze-thaw cycles to three freeze-thaw cycles). In further embodiments, the absorption capacity of the resulting pad remains relatively stable above about three or more freeze-thaw cycles.

In certain embodiments, the freezing step of the freeze-thaw cycle comprises freezing or otherwise subjecting the polymer solution or foam to temperatures below about 0° C., below about −5° C., below about −10° C., below about −15° C., or below about −20° C. And in particular embodiments, the freezing step comprises subjecting the foam to temperatures between about 0° C. and about −30° C., between about 0° C. and about −25° C., between about 0° C. and about −20° C., or between about −5° C. and about −20° C.

The duration or length of the freezing step of the freeze-thaw cycle can vary. For example, the duration or length of the freezing step can vary depending on the size and/or thickness of the absorbent pad being manufactured. A longer duration may be required for a larger or thicker absorbent pad, and a shorter duration may be sufficient for a smaller or thinner absorbent pad. In particular embodiments, for example, the freezing step is greater than about 5 hours, greater than about 10 hours, greater than about 15 hours, greater than about 20 hours, greater than about 25 hours, or greater than about 30 hours. And in other particular embodiments, the freezing step is between about 10 and about 40 hours, between about 10 and about 30 hours, or between about 20 and about 30 hours.

In certain embodiments, the thawing step of the freeze-thaw cycle comprises thawing or otherwise subjecting the frozen polymer solution or frozen foam to temperatures above about 0° C., above about 5° C., above about 10° C., above about 15° C., above about 20° C., above about 25° C., above about 30° C., or above about 35° C. And in particular embodiments, thawing comprises subjecting the frozen polymer solution or frozen foam to temperatures between about 10° C. and about 40° C., between about 15° C. and about 35° C., or between about 20° C. and about 30° C. In further embodiments, thawing comprises subjecting the frozen polymer solution or frozen foam to temperatures that are at about, or substantially close to, room temperatures (about 23° C.).

The duration or length of the thawing step of the freeze-thaw cycle can also vary. For example, analogous to the freezing step, the duration or length of the thawing step can vary depending on the size and/or thickness of the absorbent pad being manufactured. A longer duration may be required for a larger or thicker absorbent pad, and a shorter duration may be sufficient for a smaller or thinner absorbent pad. In particular embodiments, the thawing step is greater than about 1 hour, greater than about 2 hours, greater than about 3 hours, greater than about 4 hours, greater than about 5 hours, greater than about 6 hours, greater than about 7 hours, greater than about 8 hours, greater than about 9 hours, or greater than about 10 hours. And in particular embodiments, the thawing step is between about 1 and about 10 hours, between about 1 and about 9 hours, between about 1 and about 8 hours, between about 1 and about 7 hours, between about 1 and about 6 hours, between about 1 and about 5 hours, between about 1 and about 4 hours, between about 1 and about 3 hours, or between about 1 and about 2 hours.

It will be appreciated that the temperatures mentioned above for the freezing and thawing steps are applicable at approximately standard atmospheric pressures. It will also be appreciated that the duration or length of the freezing and thawing steps of the freeze-thaw cycle can be affected by the addition of additives (e.g., crystallization promoters or retardants). The duration or length of the freezing and thawing steps of the freeze-thaw cycle can also be affected by the type of polymer within the polymer solution or foam.

In certain embodiments, the method of manufacturing the absorbent pad can further comprise a step of removing the cured and/or cross-linked polymer matrix from the mold apparatus. The cured and/or cross-linked polymer matrix (which can include a reinforcement member), can then be washed. Washing can be done for various reasons, including to remove excess surfactants, emulsifiers, wetting agents, foaming agents, and/or to remove excess additives (e.g., thickening agents, stabilizers, crystallization promoters or retardants, colorants, opacifiers). Washing can also be done to remove any remaining uncured or uncross-linked polymer solution or foam.

In certain embodiments, the cured and/or cross-linked polymer matrix (which can include reinforcement member), can be sized and/or cut into individual absorbent pads. For example, in some embodiments, the absorbent pad is cut into individual pads having a length and width of about 3.5 inches by 3.5 inches, or about 3 inches by 3 inches, or about 2.5 inches by 2.5 inches. The absorbent pads can also be packaged, which can be done in either the hydrated or dehydrated state. For example, in some embodiments the absorbent pads can be hydrated or saturated with a solution (e.g., saline) prior to being packaged in pouches.

In further embodiments, the method of manufacturing an absorbent pad can comprise a sterilization step during which the cured and/or cross-linked polymer matrix (which can include a reinforcement member) can be sterilized. The sterilization step can occur prior to or after the cured and/or cross-linked polymer matrix is sized and/or packaged. For example, in some embodiments, the packaged absorbent pads can be subjected to one or more sterilization methods.

Various methods of sterilization can be used. In some embodiments, for example, sterilization of the absorbent pad comprises subjecting the cured and/or cross-linked polymer matrix to radiation such as gamma radiation. For example, the cured and/or cross-linked polymer matrix can be irradiated with between about 10 and about 50 kGy of gamma radiation, or between about 20 and about 30 kGy of gamma radiation. Other sterilization methods can also be used, including, but not limited, to beta irradiation (e.g., E-beam or electron beam irradiation).

EXAMPLES

Non-limiting examples of absorbent pads made in accordance with the present disclosure are presented in the examples below:

Example 1

A polymer solution was prepared by dissolving about 45 grams of polyvinyl alcohol (greater than 95% hydrolyzed; MW between about 80 kDA and 150 kDa) in about 300 mL of water. About 0.45 grams of sodium dodecyl sulfate was then dissolved and added to the polymer solution. The polymer solution was then mixed with a rotary beater to form a substantially homogenous foam.

The foam was dispensed into 3 different mold apparatuses (Samples 1, 2, and 3), each having a polyester grid-mesh disposed therein. Sample 1 was then cured using 2 freeze-thaw cycles, Sample 2 was cured using 3 freeze-thaw cycles, and Sample 3 was cured using 4 freeze-thaw cycles. Each freeze-thaw cycle included first freezing the foam at about −20° C. for about 22.5 hours and then thawing the foam at room temperature (about 23° C.) for about 1.5 hours.

The resulting absorbent pads having a thickness of about 1.8 mm were then removed from the molds. It was observed that the Samples exposed to more freeze-thaw cycles showed a more opaque appearance as compared to the Samples exposed to less freeze-thaw cycles.

Example 2

A polymer solution was prepared by dissolving about 45 grams of polyvinyl alcohol (greater than 95% hydrolyzed; MW between about 80 kDA and 150 kDa) in about 325 mL of water. About 0.20 grams of sodium dodecyl sulfate was then dissolved and added to the polymer solution. The polymer solution was then mixed with a rotary beater to form a substantially homogenous foam.

The foam was dispensed into 3 different mold apparatuses (Samples 4, 5, and 6), each having a polyester grid-mesh disposed therein. Sample 4 was then cured using 2 freeze-thaw cycles, Sample 5 was cured using 3 freeze-thaw cycles, and Sample 6 was cured using 4 freeze-thaw cycles. Each freeze-thaw cycle included first freezing the foam at about −20° C. for about 22.5 hours and then thawing the foam at room temperature (about 23° C.) for about 1.2 hours.

The resulting absorbent pads having a thickness of about 1.8 mm were then removed from the molds. It was observed that Samples 4-6 had porous structures having relatively larger pores than the porous structures observed in Samples 1-3.

Example 3

A polymer solution was prepared by dissolving about 45 grams of polyvinyl alcohol (greater than 95% hydrolyzed; MW between about 80 kDA and 150 kDa) in about 350 mL of water. About 11.25 grams of potato starch dispersed in about 80 mL of water, about 0.18 grams of sodium dodecyl sulfate, and about 0.23 grams of polysorbate 20 were then each dissolved and added to the polymer solution. The polymer solution was then mixed with a high speed disperser Ultra-Turrax (Brand IKA) to form a substantially homogenous foam.

A first portion of the foam was dispensed into a mold apparatus (Sample 7). A polyester grid-mesh was then disposed on top of the first portion of foam, and a second portion of foam was dispensed above the polyester grid-mesh. Sample 7 was then cured using 2 freeze-thaw cycles. Each freeze-thaw cycle included first freezing the foam at about −20° C. for about 25 hours and then thawing the foam at room temperature (about 23° C.) for about 1.25 hours.

The resulting absorbent pad having a thickness of about 1.6 mm was then removed from the molds. It was observed that the porous structure of Sample 7 was relatively finer than the porous structures of Samples 1-6.

Example 4

A polymer solution was prepared by dissolving about 45 grams of polyvinyl alcohol (greater than 95% hydrolyzed; MW between about 80 kDA and 150 kDa) in about 350 mL of water. About 11.25 grams of potato starch dispersed in about 80 mL of water, about 0.18 grams of sodium dodecyl sulfate, and about 0.37 grams of poly[dimethylsiloxane-co-[3-(2-(2-hydroxyethoxy)ethoxy)propyl]mehtylsiloxane] (PDMSHEPMS) were then each dissolved and added to the polymer solution. The polymer solution was then mixed with a high speed disperser Ultra-Turrax (Brand IKA) to form a substantially homogenous foam.

A first portion of the foam was dispensed into a mold apparatus (Sample 8). A polyester grid-mesh was then disposed on top of the first portion of foam, and a second portion of foam was dispensed above the polyester grid-mesh. Sample 8 was then cured using 2 freeze-thaw cycles. Each freeze-thaw cycle included first freezing the foam at about −20° C. for about 25 hours and then thawing the foam at room temperature (about 23° C.) for about 1.25 hours.

The resulting absorbent pad having a thickness of about 1.5-1.6 mm was then removed from the molds. It was observed that the upper surface of the absorbent pad of Sample 8 was more porous than the absorbent pad of Sample 7.

Example 5

A polymer solution was prepared by dissolving about 45 grams of polyvinyl alcohol (greater than 95% hydrolyzed; MW between about 80 kDA and 150 kDa) in about 300 mL of water. About 7.65 grams of $(NH_4)_2SO_4$ and about 1.8 grams of Triton X-100 were then each dissolved and added to the polymer solution. The polymer solution was then mixed with a rotary beater to form a substantially homogenous foam.

The foam was dispensed into a mold apparatus (Sample 9) having a polyester grid-mesh disposed therein. Sample 9 was then cured using 2 freeze-thaw cycles. The first freeze-thaw cycle included first freezing the foam at about −20° C. for about 24.6 hours and then thawing the foam at room temperature (about 23° C.) for about 2.5 hours. The second freeze-thaw cycle included freezing the foam at about −20° C. for about 77.5 hours and then thawing the foam at room temperature (about 23° C.) for about 2.5 hours.

The resulting absorbent pad having a thickness of about 1.8 mm was then removed from the molds. It was observed that the absorbent pad of Sample 9 was more opaque as compared to Samples 1-8. It was also observed that the surface of the absorbent pad of Sample 9 was smoother as compared to the surfaces of Samples 1-8.

Example 6

A polymer solution was prepared by dissolving about 40 grams of polyvinyl alcohol (greater than 95% hydrolyzed; MW between about 80 kDA and 150 kDa) in about 270 mL of water. About 0.8 grams of 2-hydroxyethyl cellulose (2-HEC) and about 0.455 grams of Triton X-100 were then dissolved in about 30 mL of water and added to the polymer solution. The polymer solution was then mixed with a rotary beater to form a substantially homogenous foam.

The foam was dispensed into several different mold apparatuses (Samples 10-13). The mold apparatus of Samples 12 and 13 included a polyester grid-mesh disposed therein, while the mold apparatus of Samples 10 and 11 did not include a polyester grid-mesh. Samples 10-13 were then cured using 2 freeze-thaw cycles. The first freeze-thaw cycle included first freezing the foam at about −20° C. for about 25.7 hours and then thawing the foam at room temperature (about 23° C.) for about 2 hours. The second freeze-thaw cycle included first freezing the foam at about −20° C. for about 22 hours and then thawing the foam at room temperature (about 23° C.).

The resulting absorbent pads were then removed from the molds and washed with clean water. The thickness of Samples 10-11 (without the polyester grid-mesh) was about 2 mm, and the thickness of Samples 12-13 was about 2.2 mm. Samples 10-13 were then wrung from absorbed water (but not dehydrated) and packaged in individual heat-sealed pouches. Samples 11 and 13 were then sterilized with about 25 kGy of gamma-irradiation. Samples 10 and 12 were not sterilized.

The strength and elasticity of Samples 10-13 was then measured and compared with a chemically cross-linked polyvinyl alcohol wipe having a thickness of about 2 mm (Comparison Sample 1). Comparison Sample 1 was made with a polyvinyl alcohol solution and potato starch, and chemically cross-linked with formaldehyde rather than the physical cross-linking methods disclosed herein. Comparison Sample 1 was also non-sterilized. The tested Samples each had a base area of about 18 cm$^2$, and the test pulling speed was about 100 mm/min. The results of the strength and elasticity measurements are shown below in Table 1.

TABLE 1

| | SAMPLE NO: | | | | |
|---|---|---|---|---|---|
| | Sample 10 | Sample 11 | Sample 12 | Sample 13 | Comparison Sample 1 |
| Max Load (N) | 37.36 | 8.75 | >40 | >50 | 18.94 |
| Elongation @ Max Load | 239% | 86.7% | 16% | 25.4% | 167.3% |
| Tensile Strength (MPa) | 0.61 | 0.16 | >0.60 | >0.85 | 0.30 |
| Young's Modulus (MPa) | 0.89 | 0.29 | >6.94 | >7.16 | 0.20 |

As shown in Table 1, Sample 10 exhibited a higher tensile strength and a higher young's modulus than the chemically cross-linked Comparison Sample 1. The max load for Sample 10 was also greater than the max load for the chemically cross-linked Comparison Sample 1.

As also shown in Table 1, the reinforcement member added strength and lowered the elastic properties of Samples 12 and 13. However, the results obtained for Samples 12 and 13 were limited by the equipment used to take the measurements. Specifically, Samples 12 and 13 were not able to be broken by the equipment during the pull to break procedure, and thus the results provided are identified as being greater than the maximum results recorded by the equipment.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

References to approximations are made throughout this specification, such as by use of the term "about." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. Additionally, all ranges include both endpoints.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims and their equivalents.

What is claimed is:

1. A method of manufacturing an absorbent pad, comprising:
    obtaining a polymer solution;
    mixing the polymer solution to form a foam;
    dispensing the foam into a mold apparatus; and
    curing the foam to form a cross-linked polymer matrix,
        wherein curing the foam comprises at least one freeze-thaw cycle, the freeze-thaw cycle comprising:
        a freezing step; and
        a thawing step.

2. The method of claim 1, wherein the polymer solution comprises a polymer or copolymer of polyvinyl alcohol, polyhydroxyethylmethacrylate, polyacrylate, polyacrylic acid, polyamine, polyamide, or derivatives or mixtures thereof.

3. The method of claim 1, wherein the polymer solution comprises between about 10% and about 20% by weight of a polymer material.

4. The method of claim 1, wherein the polymer solution comprises at least one of a surfactant, an emulsifier, a wetting agent, a foaming agent, a thickening agent, or a stabilizing agent.

5. The method of claim 1, wherein curing the foam comprises at least two freeze-thaw cycles.

6. The method of claim 1, wherein the freezing step of the freeze-thaw cycle comprises subjecting the foam to temperatures below about −10° C.

7. The method of claim 6, wherein the foam is subjected to temperatures below about −10° C. for greater than about 10 hours.

8. The method of claim 1, wherein the thawing step of the freeze-thaw cycle comprises subjecting the foam to temperatures of between about 20° C. and about 30° C.

9. The method of claim 1, further comprising disposing a reinforcement member into the mold apparatus, wherein the step of disposing the reinforcement member occurs prior to curing foam.

10. The method of claim 1, wherein the reinforcement member comprises a mesh or scrim.

11. The method of claim 1, wherein the mold apparatus is configured to impart a texture to a surface of the cross-linked polymer matrix.

12. The method of claim 1, further comprising impregnating the cross-linked polymer matrix with at least one of an anticoagulant, an antimicrobial, or a cleansing solution.

13. The method of claim 1, wherein the cross-linked polymer matrix is hydrophilic, absorbent, and elastic.

14. The method of claim 1, wherein the cross-linked polymer matrix comprises a water-swellable hydrogel having a porous structure.

15. The method of claim 1, wherein the polymer matrix is configured to be hydrated and dehydrated.

16. The method of claim 1, wherein the thickness of the cross-linked polymer matrix is between about 1.0 mm and about 2.5 mm.

17. The method of claim 1, wherein the cross-linked polymer matrix is lint free, non-fibrous, and non-particulate.

* * * * *